April 24, 1962  C. R. BROWN  3,031,108
METERING FEEDING MECHANISM
Filed Dec. 28, 1959  2 Sheets-Sheet 1
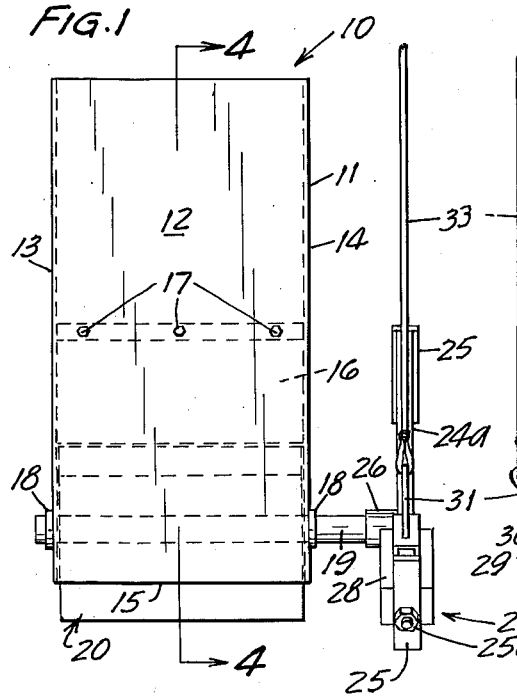
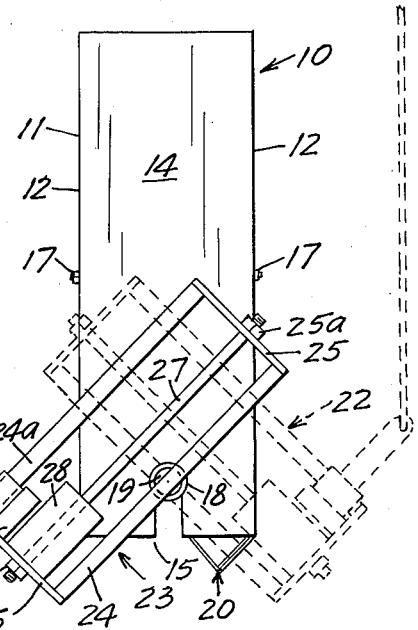
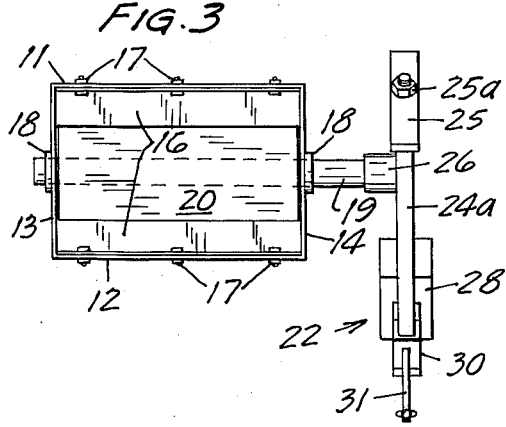
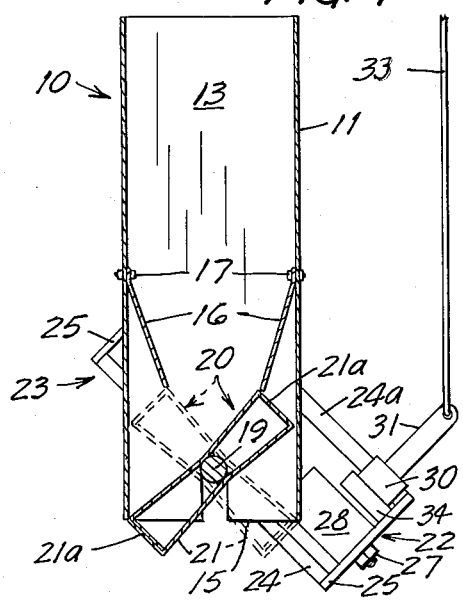
INVENTOR
CLIFFORD R. BROWN
BY
Williamson, Schroeder & Palmatier
ATTORNEYS INVENTOR
CLIFFORD R. BROWN
BY
Williamson, Schroeder, Halmatier
ATTORNEYS

United States Patent Office 3,031,108
Patented Apr. 24, 1962

3,031,108
METERING FEEDING MECHANISM
Clifford R. Brown, Albert Lea, Minn., assignor to National Cooperatives, Incorporated, Albert Lea, Minn., a corporation of the District of Columbia
Filed Dec. 28, 1959, Ser. No. 862,337
8 Claims. (Cl. 222—196)

This invention relates to feed metering devices and more specifically to feed metering devices for use in conjunction with conduits through which feed material is passed.

An object of this invention is to provide a novel feed metering device, of simple and inexpensive construction, for use in metering feed through a conduit through which feed material is passed.

Another object of this invention is to provide a novel feed metering device including a conduit having a conduit-closing valve mechanism arranged and constructed to be shifted in a manner to permit a predetermined amount of feed material to be discharged through the feed outlet of the conduit.

A more specific object of this invention is to provide a novel feed metering device including a valve mechanism for controlling the flow of material through a conduit and a valve control mechanism arranged and constructed to prevent bridging of material within the conduit.

A still further object of this invention is to provide a novel and improved feed metering device including a conduit having a valve mechanism for controlling the flow of feed material therethrough and arranged and constructed to be operated at a point remotely spaced from the device.

These and other objects and advantages of this invention will more fully appear from the following description, made in connection with the accompanying drawings, wherein like reference characters refer to the same or similar parts throughout the several views, and in which:

FIG. 1 is a side elevational view of the invention with certain concealed portions thereof indicated in dotted line configuration for the purpose of clarity;

FIG. 2 is an end elevational view of the invention with the valve control mechanism indicated in a different position by dotted line configuration;

FIG. 3 is a top plan view of the invention; and FIG. 4 is a vertical section taken on line 4—4 of FIG. 1; and looking in the direction of the arrows;

Figure 5:
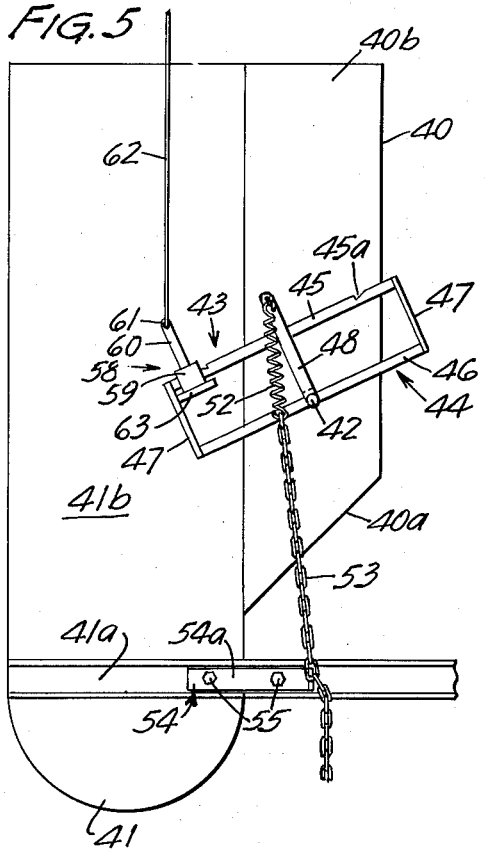
FIG. 5 is a rear elevational view of a different embodiment of my invention.

One embodiment of my novel feed metering device, generally designated as 10, may include a conduit 11 through which granular material, such as livestock feed, is moved. The novel feed metering device 10 is especially adaptable for use in milk stalls whereby a predetermined amount of feed material may be discharged into a feeding trough for the animal to eat during the milking operation.

Conduit 11, as best seen in FIG. 3, has a substantially rectangular cross sectional configuration and includes opposed side walls 12, front wall 13 and a rear wall 14. In the embodiment shown, in FIGS. 1–4, conduit 11 is disposed in substantially upstanding relation to permit the granular feed material to be moved therethrough by action of gravity so that the feed material may ultimately discharge through feed outlet 15. Referring now to FIG. 4, it will be seen that conduit 11 is provided with a pair of baffle members or plates 16 each being secured to one of the side walls 12 by means of bolts 17. It will be noted that baffle members 16 converge in funneling relationship with respect to each other towards the discharge outlet 15.

Front and rear walls 13 and 14 respectively are provided with bearings 18 which rotatably support an elongate shaft 19. It will be noted that shaft 19 extends across the interior of conduit 11 from front to rear and has one end thereof extending outwardly a substantial distance from the rear wall 14. A butterfly type valve element 20 is disposed within the interior of conduit 11 adjacent the feed outlet 15 and is affixed to elongate shaft 19 as by welding for rotation therewith. Valve element 20 may be formed from a single blank of metallic material and includes a pair of opposed plates 21 interconnected at their side edges by side plates 21a and is of substantially hollow rectangular cross sectional configuration. The median portions of the inner sides of plates 21 are secured to elongate shaft 19 as by welding so that valve element 20 extends outwardly of elongate shaft 19.

Referring now to FIG. 4, it will be seen that valve element 20 serves to close the conduit 11 adjacent feed outlet 15. It will be noted that when valve element 20 is disposed in conduit-closing relation, it is positioned in inclined relation with respect to the interior of conduit 11, shown in full line configuration, and is shiftable to another inclined position as indicated in dotted line configuration in FIG. 4, with respect to the interior of conduit 11 when shaft 19 is rotated. The lower ends of baffle plate 16 are alternately engaged by one side edge portion of valve element 20 when the valve is in the conduit-closing positions and the other side edge portions of the valve element 20 alternately engages the inner surfaces of side walls 12. Again referring to FIG. 4 of the drawings, it will be noted that when valve element 20 is in either of the inclined conduit-closing positions, one of the opposed plates 21 will be disposed substantially co-extensively with respect to one of the baffle plates 16. With this arrangement, substantially only the portion of the feed material occupying the space just above the valve element and between the lowermost extremes of baffle plates 16 will be discharged.

Means are also provided for controlling the rotation of valve element 20 and include a valve control mechanism designated by the reference numeral 22 as best seen in FIG. 2. Referring now to FIG. 1, it will be seen that valve control mechanism 22 is mounted on shaft 19 exteriorly of conduit 11 adjacent the rear wall 14. Valve control mechanism 22 includes an elongate member 23 comprised of a pair of substantially parallel elongate bars 24 and 24a interconnected at their respective ends by a pair of end bar elements 25. Elongate bar 24 is welded intermediate the ends thereof to the end of a sleeve 26 which in turn is mounted on the end of shaft 19 so that elongate member 23 will rotate with the shaft.

An elongate supporting rod 27 is positioned between elongate bars 24 and 24a and extends between and is secured to the end bar elements 25 by lock nuts 25a. A weighted element or block 28 is slidably mounted on the weight supporting rod 27 for sliding movement longitudinally thereof. It will be noted that block 28 is slidable along rod 27 from one side of the shaft to the other by action of gravity, and its particular position on rod 27 is dependent upon the orientation of elongate frame member 23. Referring now to FIG. 4, it will be seen that the longitudinal axis of elongate member 23 is disposed at an angle with respect to the general plane of valve element 20. When the valve element 20 is disposed in the inclined conduit-closing relation, as shown in the full line configuration of FIG. 4, valve control mechanism 22 prevents rotation of the valve element to the other extreme position as shown in the dotted line configuration of FIG. 4. Valve control mechanism 22 is limited in its pivotal movement because of the engaging relationship of valve element 20 with respect to conduit 11.

Valve control mechanism 22 also includes means for pivoting elongate member 23 which, of course, causes rotation of shaft 19 and valve element 20. This means includes an actuating element 29 which is comprised of a sleeve 30 mounted in co-axial relation on elongate bar 24a. An arm 31 is affixed to sleeve 30 and, as seen in FIG. 2, is disposed normal to the longitudinal axis of elongate bar 24a. The outer end of arm 31 is provided with an opening 32 which provides a connecting means for an elongate flexible pull rope 33. A weighted element 34 is affixed to sleeve 30 so that actuating member 29 will readily slide along the elongate bar 24a when elongate member 23 is pivoted past an overcenter relation with respect to shaft 19. Pull rope 33 may extend to a point remote from the feed metering device 10 so that the device may be operated from a point remote therefrom.

When my novel feed metering apparatus 10 is used, for example, in conjunction with a milking stall, the conduit 11 is positioned in upright relation with the feed outlet 15 disposed adjacent the feeding trough from which the cow will eat. Pull rope 33 may be trained over pulleys or the like and has the free end thereof positioned for ready access. The pull rope is pulled either manually or by other means and the actuating element is moved upwardly, as for example, from the position shown in full line configuration in FIG. 2. When elongate member 23 moves past a horizontal or over-center position, the valve element will also be simultaneously moved past a dead center position. The weighted element will then slide along the weight supporting rod 27 to the opposite end thereof to cause the valve element to move past the dead center position to the other conduit closing position. As valve element 20 rotates, a predetermined amount of granular material will be discharged through the feed outlet 15 into the trough and, of course, the conduit is again closed. As weighted element 28 strikes the flat bar elements 25 at the end of its longitudinal travel, it imparts a jarring effect to the conduit so that any tendency of the feed material disposed above the baffle plate 16 to bridge will be precluded. It will also be noted that actuator element 29 will slide to the opposite end of elongate rod 24a as the elongate member 23 moves past the over center position to thereby reposition the actuator element 29 in a position for ready pivoting of elongate member 23.

Figure 6:
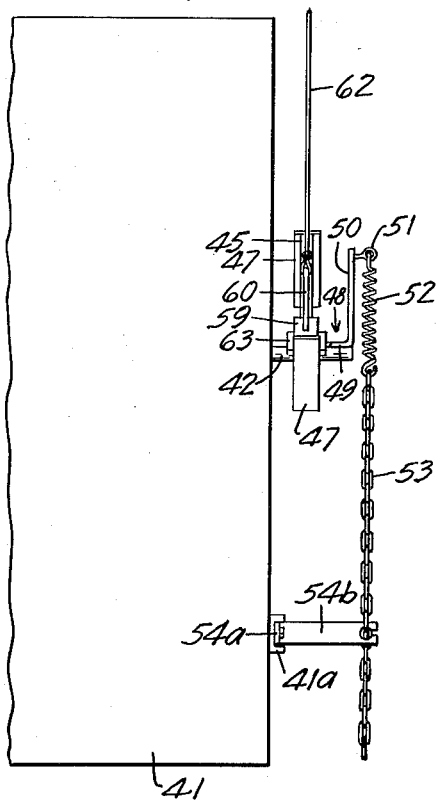
FIG. 6 is a side elevational view of the embodiment shown in FIG. 5 with parts thereof broken away.
Figure 7:
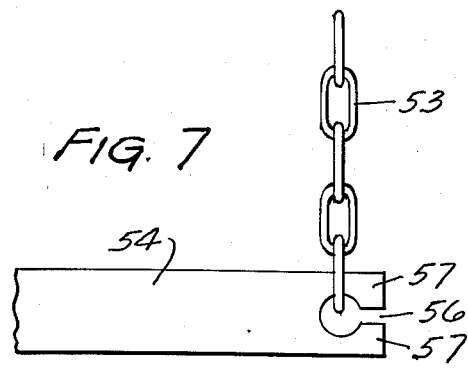
FIG. 7 is a detailed view on an enlarged scale of the chain and bracket.

Referring now to FIGS. 5, 6 and 7, it will be seen that I have provided as the preferred embodiment of my novel feed metering device, a conduit 40 which is similar in construction to that disclosed in FIGS. 1-4 and is shown mounted to the feed receptacle 41 of the type commonly used in milking stalls. Conduit 40 is provided with an inclined lower wall 40a which directs the feed discharge through the valve element into the receptacle. In FIG. 5, the feed metering mechanism is illustrated in a rear elevational view and it is understood, of course, that the interior of the conduit 40 along with the valve element disposed therein is essentially the same as that disclosed in the embodiment of FIGS. 1-4. The valve element, which is not shown in the embodiments of FIGS. 5-7, is rotatably mounted within the conduit 40 on a shaft 42 which extends outwardly of the rear wall of the conduit as best seen in FIG. 6.

The means for controlling the rotation of the valve element in the embodiment disclosed in FIGS. 5-7 include a valve control mechanism designated in its entirety by the reference numeral 43 as best seen in FIG. 5. Referring now to FIG. 6, it will be seen that valve control mechanism 43 is mounted on shaft 42 exteriorly of conduit 40 adjacent the rear wall 40b thereof.

Valve control mechanism 43 includes an elongate member 44 comprised of a pair of substantially parallel elongate bars 45 and 46 respectively interconnected at their respective ends by a pair of end bar elements 47. Although not disclosed, elongate bar 46 may be provided with a sleeve secured thereto as by welding which, of course, will serve to mount the valve control mechanism on shaft 42 in the manner disclosed with respect to the embodiment shown in FIGS. 1-4. It is understood that the longitudinal axis of elongate member 44 will be disposed at an angle to the longitudinal axis of the valve element in the manner disclosed in the embodiment of FIGS. 1-4.

An L-shaped bracket 48 is secured to bar 46 intermediate the ends thereof as best seen in FIG. 5. L-shaped bracket 48 includes a substantially horizontal short leg 49 which has one of its ends affixed to elongate bar 46 substantially bisecting the length thereof and extends outwardly therefrom. The horizontal shorter leg 49 terminates at its other end in an upstanding elongate leg 50 which is provided with an eye bolt 51 connected adjacent its upper end as best seen in FIG. 6. It will also be noted that the shorter leg portion 49 is disposed substantially normal to the longitudinal axis of elongate bar 46. A coil spring 52 has one end thereof secured to eye bolt 51 and has an elongated link chain 53 secured to the other end thereof.

The feed receptacle 41 has a channel member 41a affixed to the rear wall 41b thereof and extending transversely relative thereto. An L-shaped bracket 54 is comprised of a pair of legs 54a and 54b with legs 54a positioned against and secured to channel member 41a by means of bolts 55. Leg 54b which extends rearwardly outwardly from channel member 41a is provided with keyhole shaped notch or slot 56 at the outer end thereof to define a pair of laterally spaced fingers 57. Anyone of the lowermost links of chain 53 may be positioned around the uppermost of fingers 57 so that the tension on spring 52 may be selectively adjusted.

Valve control mechanism 43 also includes means for pivoting elongate member 44 which, of course, causes rotation of shaft 42 and whereby valve element 20 will rotate from one of the conduit closing positions to an over center position. This means includes an actuating element 58 which is comprised of a sleeve 59 mounted in co-axial relation on elongate bar 45. An arm 60 is affixed to sleeve 59 and, as best seen in FIG. 5, is disposed normal to the longitudinal axis of elongate bar 45. The outer end of arm 60 is provided with an opening 61 to which is connected an elongated flexible pull rope 62. A weighted element 63 is affixed to sleeve 59 so that actuating member 58 will slide along the elongate bar 45 when elongate member 44 is pivoted past an overcenter relation with respect to shaft 42.

It will be noted that elongate bar 45 is notched as at 45a adjacent but spaced inwardly of the respective ends thereof. Notches 45a are located at points spaced inwardly of their associated ends of bar 45a so that when sleeve 59 is disposed in abutting relation with an end bar element 47, the innermost end of sleeve 59 is disposed adjacent one of the notches 45a. The internal opening or bore of sleeve 59 is slightly larger than the cross sectional area or diameter of bar 45 so that when pull rope 62 is pulled, sleeve member 59 will pivot and engage notch 45a whereby the actuating element 58 is locked with respect to bar 45. The actuating member and the bar remain in locked position until the actuating element passes over an over center relation and, of course, will become disengaged therefrom.

After elongate member 44 moves past an over center relationship, the valve element will also be in an over center relationship and spring 52 will cause the elongate member 43 to move past the over center relationship into the other extreme position. During this movement of elongate member 44, the valve element is also simultaneously moved from its over center relationship and also quickly moves into the other conduit-closing position. Actuating member 58 will have become disengaged from its notch 45a when the elongate member is moved past the over center relationship and will slide to the other end thereof. The action of spring 52 upon the valve element is rapid and causes the valve element to impart a jarring action upon the conduit 40 so that the material within the conduit will be prevented from bridging. Pull rope 62 may also extend to a point remote from the feed metering device so that the device may be operated at a point remote therefrom.

It will therefore be seen from the foregoing description that I have provided a novel feed metering device arranged and constructed to readily meter feed material or the like. It will also be seen that my novel feed metering device is especially adaptable for use with the feeding of livestock wherein a predetermined amount of feed may be discharged in, for example, a feeding trough by a relatively simple operation. When used in this manner, it will be seen that the time consuming operation of laboriously measuring a desired amount of material for feed purposes or the like is avoided and thus there is a great saving of time and labor.

It will also be noted from the preceding paragraphs that my novel feed metering mechanism includes relatively few parts and is of such unique construction and operation to minimize any mal-functioning thereof. It will also be seen that my feed metering device includes a valve control mechanism which not only controls the rotation of the valve and maintains the positioning thereof but also serves to impart a jarring action to the conduit to prevent bridging of any granular material therein. This problem of granular material bridging or clogging a conduit is especially troublesome when the conduit is disposed in a position which is not easily accessible and, of course, time and effort are expended in unclogging the conduit. It will also be noted that my novel feed metering device is arranged and constructed so that it may be operated at a point remote thereof which, of course, permits the device to be used in places ordinarily which are difficult to gain access to.

A plurality of my novel feed metering mechanisms may be arranged to be simultaneously tripped by pulling a single lever to which all the pull ropes are attached so that feed may be simultaneously delivered to feeding troughs of several milking stalls in one operation. It will also be noted that my novel feed mechanism is arranged and constructed to permit any desired amount of feed to be delivered to a feeding trough by tripping the mechanism a multiple number of times. This is extremely desirable when, for example, it is necessary to deliver a greater portion of feed material to heavier milking animals.

It will, of course, be understood that various changes may be made in the form, details, arrangement and proportions of the parts without departing from the scope of this invention which consists of the matter shown and described herein and set forth in the appended claims.

What is claimed is:

1. Feed metering device comprising a vertically extending conduit adapted to have feed move therethrough, a valve element having dimensions sufficient to close off said conduit and being rotatably mounted within said conduit and limitedly rotatable between a pair of conduit closing positions, and valve control mechanism for controlling rotation of said valve element between said positions including an elongate member connected to said valve element and extending transversely of the axis of rotation of said valve element and moving therewith as said valve element rotates, mechanical means connected with said elongate member for causing said valve element to rotate beyond half way from one of said conduit-closing positions toward the other of said positions, and additional means including a movable member adapted to move between a first and second position connected with said elongate member for automatically causing said valve element to complete its rotation from beyond half way to the other of said conduit-closing positions upon said movable member moving from a first to a second position.

2. The structure as defined in claim 1 wherein said additional means slides relative to said elongate member and imparts a jarring action to said conduit when said valve element is rotated from one conduit closing position to another.

3. The structure as defined in claim 1 including a pull rope connected to said means for causing said elongate member to pivot, said pull rope being actuatable at a point remote from said elongate member.

4. A feed metering device comprising a vertically extending conduit adapted to have feed move therethrough, a valve element having dimensions sufficient to close off said conduit and being rotatably mounted on a shaft within said conduit and rotatable between a plurality of conduit-closing positions, and means controlling the rotation of said valve element between said positions, said means including an elongate member connected intermediate its ends to said valve element and means for moving said elongate member with said valve in a vertical plane as said valve element rotates and including a weighted member connected to said elongate member and shiftable relative thereto longitudinally thereof to opposite sides of said shaft upon elevation of said weighted member to an elevation substantially above said shaft, said elongate member moving with said valve element about the axis of pivot of the latter as said valve element moves from one of said positions to the other.

5. Feed metering device comprising a vertically extending conduit adapted to have feed move therethrough, a shaft rotatably mounted across the interior of said conduit, a valve element mounted on said shaft and extending outwardly therefrom and having dimensions sufficient to close off said conduit when positioned thereacross and being limitedly rotatable with said shaft between a pair of inclined conduit-closing positions, means engaging said valve element and preventing the same from rotating beyond said positions, a valve control mechanism connected to said shaft outwardly of said valve element for controlling the rotation of said valve element between said positions, said mechanism including an elongate member extending transversely of said shaft and having its longitudinal axis disposed at an angle to the axis of rotation of said valve element, said elongate member being movable with said shaft and connected intermediate its ends to said shaft, a weighted element connected in sliding relation to said elongate member and being slidable to opposite sides of said shaft along said elongate member as said valve element rotates from one of said positions to the other and mechanical means connected with said elongate member and actuated remotely relative thereto for causing said elongate member to pivot with said shaft and valve element and thereby move said valve element from one of said inclined conduit-closing positions beyond half way toward the other of said positions and simultaneously elevating said weighted element above a horizontal plane formed by said elongate member.

6. A feed metering mechanism for use within a feed conduit having vertically extending walls to meter feed from the discharge outlet of such a conduit comprising a shaft adapted to be rotatably mounted across the interior of such a conduit, a valve element mounted on said shaft and rotating therewith when the latter is so mounted within such a conduit, said valve element extending outwardly from said shaft and being constructed and arranged to engage the wall structure of such a conduit to close off the outlet thereof when said shaft is so mounted, and a valve control mechanism connected to said shaft outwardly of said valve element, said mechanism including an elongated member extending transversely of said shaft, said valve, shaft and elongate member being pivotable from one extreme position to another extreme position, when said shaft is so mounted within such a conduit, a weighted element mounted on said elongated member in sliding relation thereto, said weighted member being slidable to opposite sides of said shaft along said elongated member as said member pivots from one of said positions to the other, and means for pivoting said shaft and said elongated member from one extreme position to the other.

7. Feed metering device comprising a vertically extending a conduit adapted to have feed move therethrough, a valve element rotatably mounted within said conduit and having dimensions sufficient to close off said conduit and being rotatable between a pair of conduit closing positions, valve control mechanism for controlling rotation of said valve element between said position including an elongate member connected to said valve element and extending transversely of its axis of rotation and moving therewith as said valve element rotates, means connected with said elongate member for causing said valve element to rotate from one of said conduit closing positions beyond half way to its other closing position to an over center position, and a resilient member connected with said elongate member and anchored and arranged to urge said valve element to continue its rotation to said other closing position after it has passed the half way mark toward the same.

8. Feed metering device comprising a vertically extending conduit adapted to have feed move therethrough, a shaft rotatably mounted across the interior of said conduit, a valve element fixedly mounted at its midlength on said shaft and being adapted to close off said conduit and extending outwardly from and being rotatable with said shaft between a pair of conduit closing positions in each of which said valve element is inclined relative to a horizontal plane, a valve control mechanism connected to said shaft outwardly of said valve element between said positions, said mechanism including an elongate member fixedly mounted intermediate its ends upon said shaft and extending transversely of said shaft and having its longitudinal axis disposed at an angle to the general plane of said valve element, said elongate member being movable with said shaft, means connected with said elongate member for causing said valve element to rotate from one of said conduit-closing positions beyond half way toward its other closing position, and a resilient, tensioned member connected with said elongate member and anchored and arranged to cause said valve element to move the remainder of the way to the other of said conduit closing positions once it has rotated beyond half way toward the same.

References Cited in the file of this patent
UNITED STATES PATENTS

| | | |
|---|---|---|
| 2,569,085 | Wood et al. | Sept. 25, 1951 |
| 2,694,515 | Green | Nov. 16, 1954 |
| 2,706,581 | Albers | Apr. 19, 1955 |